United States Patent

Harada et al.

[11] Patent Number: 4,624,884
[45] Date of Patent: Nov. 25, 1986

[54] HEAT RADIATING INSULATION FOR COIL

[75] Inventors: Hitoshi Harada; Yasumi Ohsera, both of Kariya, Japan

[73] Assignee: Nippondenso Co., Ltd., Kariya, Japan

[21] Appl. No.: 775,108

[22] Filed: Sep. 11, 1985

Related U.S. Application Data

[63] Continuation of Ser. No. 392,368, Jun. 25, 1982, abandoned.

[30] Foreign Application Priority Data

Jul. 1, 1981 [JP] Japan .................. 56-102430

[51] Int. Cl.$^4$ .................. B32B 5/16; B44D 1/094; B44D 1/44
[52] U.S. Cl. .................. 428/218; 428/328; 428/329; 428/404; 428/698; 428/702; 428/416; 428/480; 428/473.5; 428/514; 427/116; 242/7.08; 336/82; 336/234
[58] Field of Search .................. 428/473.5

[56] References Cited

U.S. PATENT DOCUMENTS

| | | | |
|---|---|---|---|
| 3,503,797 | 3/1970 | Hagiwara et al. | 427/116 |
| 3,813,294 | 5/1979 | Dyer et al. | 427/116 |
| 4,091,164 | 5/1978 | Schwartz | 428/404 |
| 4,336,301 | 6/1982 | Shaw | 428/404 |
| 4,345,003 | 8/1982 | Matsushima et al. | 428/404 |
| 4,348,343 | 9/1982 | Akerberg et al. | 428/404 |
| 4,356,237 | 10/1982 | Sprengling et al. | 428/404 |

FOREIGN PATENT DOCUMENTS

| | | | |
|---|---|---|---|
| 117963 | 11/1974 | Japan . | |
| 56-863 | 1/1981 | Japan . | |
| 357510 | 9/1931 | United Kingdom | 428/698 |

Primary Examiner—P. C. Ives
Attorney, Agent, or Firm—Cushman, Darby & Cushman

[57] ABSTRACT

A thermosetting synthetic resin composition consisting mainly of, for example, an epoxy resin is melted at a temperature of 70° to 130° C. After adding a filler to the resin composition, the resultant mixture is kneaded and rapidly cooled. The composition consists of a thixotropy agent, a leveling agent, etc., in addition to the epoxy resin and a curing agent for the epoxy resin. Aluminum as the filler is added in the amount of 30 wt % to 100 wt % of the mixture. The mixture of the composition with the filler is kneaded and rapidly cooled and is then pulverized to prepare a powder. The powder coating thus obtained is coated on a coil and is cured to provide a heat radiating insulator.

6 Claims, 11 Drawing Figures

F I G. 5
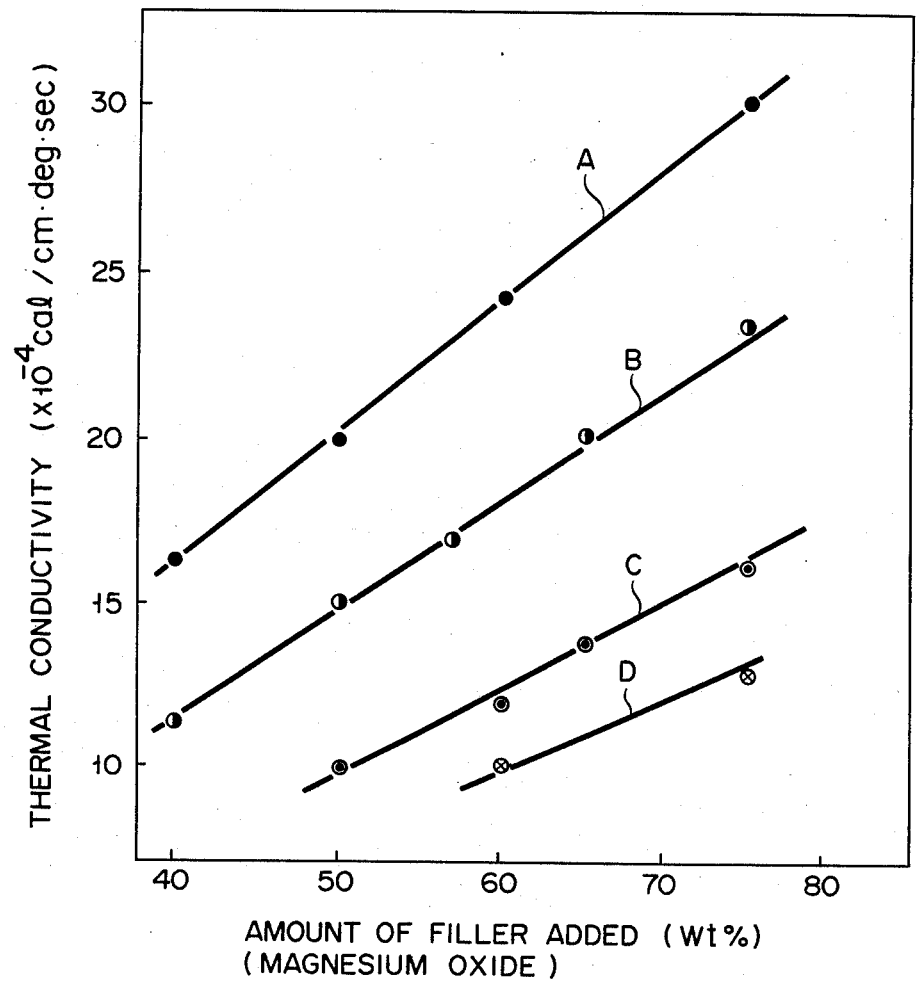

F I G. 7A
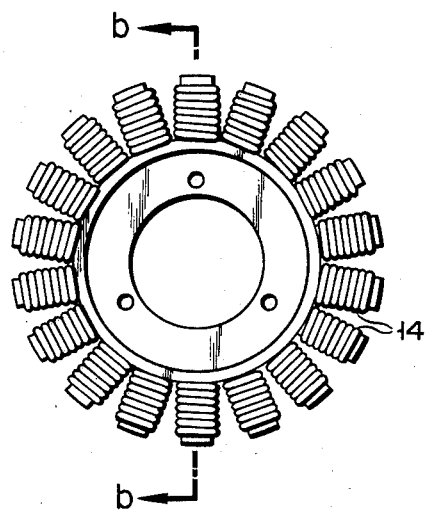
F I G. 7B
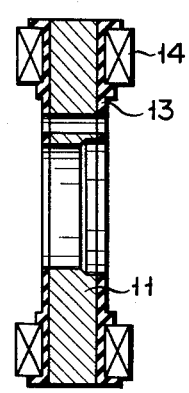
F I G. 7C
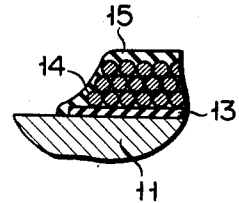
F I G. 8
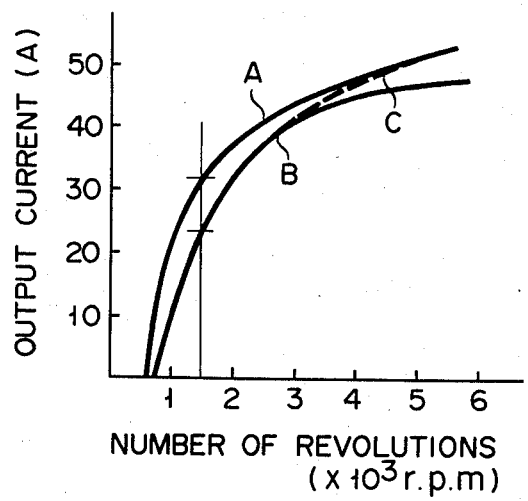
F I G. 9
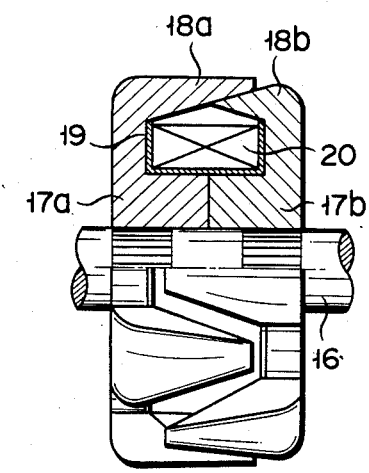

HEAT RADIATING INSULATION FOR COIL

This is a continuation, of application Ser. No. 392,368, filed Jun. 25, 1982, which was abandoned upon the filing hereof.

BACKGROUND OF THE INVENTION

The present invention relates to a heat radiating insulator for a coil. The insulator is used, for example, after hardening to securely hold, for example, a stator coil and/or a rotor coil of an electric motor of an automobile electric component, and to effectively prevent overheating of the stator coil and/or the rotor coil.

In rotary equipment such as an electric motor of an automobile electric component, the stator section has a configuration as shown in FIGS. 1 and 2. Referring to FIGS. 1 and 2, a core 11 comprises a laminate body of a number of silicon steel sheets and has a cylindrical opening for receiving a rotor (not shown). A number of slots 12 are formed in the inner surface of the cylindrical opening of the core 11. An insulator layer 13 is formed on the outer end surface of the core 11, and on the inner cylindrical surface having these slots 12. A stator coil 14 is mounted to the core 11 having the insulator layer 13 by being fitted within the slots 12. An insulator 15 is coated over the stator coil 14 to fix the stator coil 14.

In equipment with a stator coil of the configuration described above, heat is generated upon flowing a current through the stator coil 14, as shown in FIG. 3. Heat is then conducted to the core 11 through the insulator layer 13, or is radiated into the air through the insulator 15 fixing the stator coil 14. The insulator layer 13, also formed on the slots 12, generally comprises an epoxy powder, polyester, paper, a resin, or the like. The insulator 15 for fixing the stator coil 14 generally comprises an epoxy powder, epoxy coating, polyester coating, polyimide coating or the like. The parts of the stator coil of the configuration as described above have the thermal conductivities shown in Table 1 below:

TABLE 1

| Parts | Material | Thermal Conductivity (cal/cm · deg · sec) |
|---|---|---|
| Core | Iron | $1.5 \times 10^{-1}$ |
| Coil | Copper | $9.2 \times 10^{-1}$ |
| Insulator | Plastics | $3-5 \times 10^{-4}$ |

As can be seen from Table 1, the thermal conductivity of the insulator is extremely low compared to that of other parts of the coil. This means that the insulator is the single most significant factor responsible for the temperature rise in the coil. In an electric motor or the like, during overheating, the output decreases due to copper loss resulting from the temperature rise. Thus, the magnet wire for the coil must be heat resistant, and the manufacturing cost is high.

In order to solve these problems, it has been proposed to improve heat radiation by mixing in fine particles of an inorganic material, for example, alumina powder or calcium carbonate, into a synthetic resin composition. However, when a relatively large amount of fine particles is added so as to improve heat radiation, mechanical strength is lowered and electrical insulation performance is degraded. For example, when calcium carbonate is used, the heat radiation effect obtainable is either limited or otherwise unsatisfactory.

SUMMARY OF THE INVENTION

It is an object of the present invention to provide a heat radiating insulator which is capable of securely fixing a coil while giving excellent electrical insulation performance when it is used for a stator coil and/or a rotor coil of an electric motor of an automobile electric component.

It is another object of the present invention to provide an insulator which is capable of radiating heat generated by a coil securely fixed thereby into the air with excellent heat radiation characteristics.

It is still another object of the present invention to prevent a drop in output during overheating due to copper loss resulting from a temperature rise, and to dispense with heat-resistance treatment of the wire in a coil of an electric motor or the like.

The insulator according to the present invention can be hardened into the form of a film and consists of a mixture of a resin composition with a filler such as a metal, a metal oxide, a nitride, a carbide, or the like. The filler must have a thermal conductivity of $1.0 \times 10^{-2}$ cal/cm.deg.sec or more, a particle size of $200\mu$ or less, and a bulk density of 1.0 to 3.5 g/cc. Magnesium oxide is preferably used as the filler, but other types of filler include beryllium oxide, boron nitride, iron, aluminum, copper, and so on. The mixing ratio of the filler is selected such that a withstand voltage of 9 kV/mm or more may be obtained.

BRIEF DESCRIPTION OF THE DRAWINGS

FIG. 5 is a graph showing the thermal conductivity as a function of the amount of the filler added;

FIG. 7A is a front view of a magneto stator using the insulator according to the present invention;

FIG. 7B is a sectional view of the stator shown in FIG. 7A along the line b—b therein;

FIG. 7C is a partial sectional view of the coil of the stator shown in FIG. 7A;

FIG. 8 is a graph showing the output current as a function of the revolution per minute of the rotor; and FIG. 9 is a partial cutaway view of a rotor using the insulator according to the present invention.

DETAILED DESCRIPTION OF THE PREFERRED EMBODIMENTS

EXAMPLE 1

Figure 1:
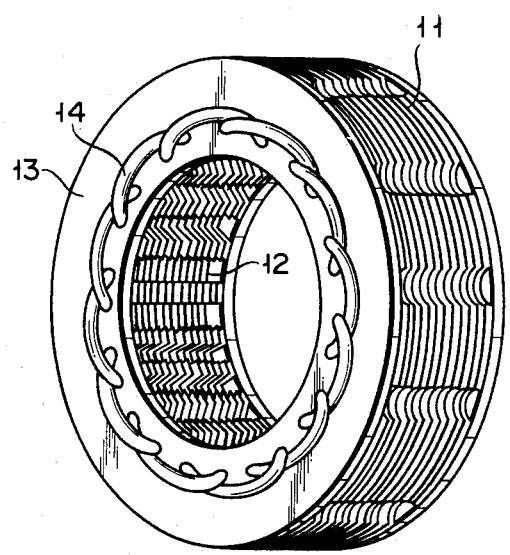
FIG. 1 is a view of a stator of an electric motor.
Figure 2:
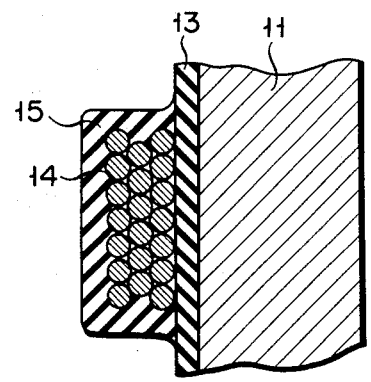
FIG. 2 is a partial sectional view of the coil of the stator shown in FIG. 1.
Figure 3:
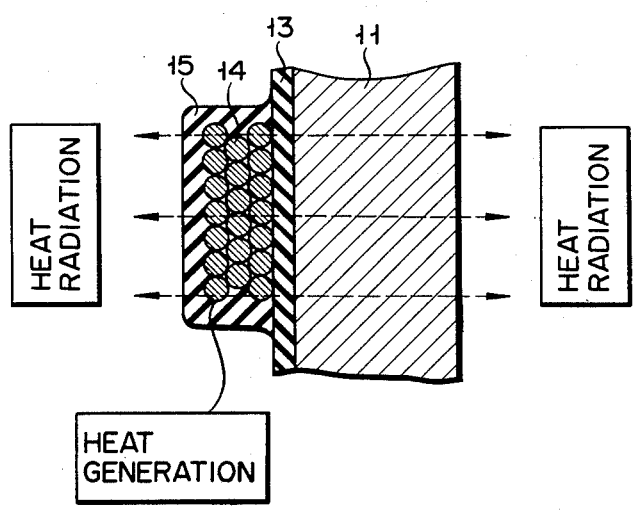
FIG. 3 is a view illustrating heat radiation in the sectional structure shown in FIG. 2.

An insulator of this example mainly consists of an epoxy resin, and is manufactured and coated in the manner to be described below.

To a mixture of an epoxy resin (e.g., Epicoat 1004 or 1007 available from Shell Chemical Inc.) and a curing agent for the epoxy resin (e.g., imidazole) were added a pigment, a thixotropy agent (e.g., fine particles of colloidal silica), and a leveling agent (e.g., acrylic oligomer) to prepare a thermosetting synthetic resin composition. Thirty wt % of a filler to be described later were added to 100 wt % of this thermosetting synthetic resin composition. The resultant mixture was kneaded at a temperature between 70° and 130° C., rapidly cooled, and then pulverized. The filler may be aluminum.

An insulator layer was formed by applying and then curing the powder coating thus obtained. This insulator layer had a thermal conductivity of $10 \times 10^{-4}$ cal/cm. deg.sec and gave satisfactory electric insulation performance. In addition, it had a withstand voltage of 9 kV/mm or more.

EXAMPLES 2 to 9

The mixing ratio of the thermosetting synthetic resin composition remained the same as in Example 1; the type and amount of the filler to be added, however, varied. Seventy wt % of aluminum was added as the filler in Comparative Example A, 30 wt % of copper was added as the filler in Example 2, and titanium oxide was used as the filler in Example 9.

The types and amounts of the filler used in Examples 1 to 9 are shown as numbered Examples 1 to 9 in Table 2, together with the characteristics of the resultant insulator layers. Examples A to F in Table 2 are Comparative Examples and are not the Examples of the present invention.

TABLE 2

| Example | Type of Filler | Content (wt %) | Thermal Conductivity of Insulator Layer (cal/cm · deg · sec) | Problem |
| --- | --- | --- | --- | --- |
| 1 | Aluminum | 30 | $10 \times 10^{-4}$ | None |
| A | Aluminum | 70 | $39 \times 10^{-4}$ | Insulating Properties (6 kV/mm) |
| 2 | Copper | 30 | $10 \times 10^{-4}$ | None |
| 3 | Boron Carbide | 60 | $17 \times 10^{-4}$ | None |
| 4 | Beryllium Oxide | 60 | $20 \times 10^{-4}$ | None |
| 5 | Magnesium Oxide | 30 | $9.0 \times 10^{-4}$ | None |
| 6 | Magnesium Oxide | 75 | $23 \times 10^{-4}$ | None |
| B | Magnesium Oxide | 90 | $30 \times 10^{-4}$ | Brittle (Du Pont Impact Test: 15 cm) |
| 7 | Alumina | 60 | $10.5 \times 10^{-4}$ | None |
| 8 | Alumina | 80 | $17 \times 10^{-4}$ | None |
| C | Alumina | 90 | $22 \times 10^{-4}$ | Brittle (Du Pont Impact Test: 10 cm) |
| 9 | Titanium Oxide | 60 | $9.2 \times 10^{-4}$ | None |
| D | Silicon Oxide | 60 | $8.5 \times 10^{-4}$ | Poor Heat Radiation |
| E | Silicon Oxide | 70 | $11 \times 10^{-4}$ | Brittle (Du Pont Impact Test: 15 cm) |
| F | Calcium Carbonate | 80 | $8.7 \times 10^{-4}$ | Poor Heat Radiation |

As can be seen from Table 2, if aluminum is added in the amount of 30 wt % as the filler, the insulator layer has a thermal conductivity of $10 \times 10^{-4}$ cal/cm. deg.sec which is satisfactory as an insulator for a coil of an automobile electric component. The insulator layer moreover has a good withstand voltage of 9 kV/mm or more. However, if the amount of aluminum exceeds 70 wt %, the insulating property is degraded. Therefore, the amount of aluminum must be so controlled that the withstand voltage may be 9 kV/mm or more.

If magnesium oxide is added in the amount of 90 wt % as the filler, the insulator layer becomes brittle and of inferior impact resistance.

If calcium carbonate, which is conventionally used as the filler, is added in the amount of 80 wt %, the resultant insulator layer has an unsatisfactory thermal conductivity and may not serve to radiate the heat generated by the coil. Calcium carbonate has a thermal conductivity of $6 \times 10^{-3}$ cal/cm.deg.sec.

Examples having the word "none" set against them in the column "Problem" are satisfactory as a heat radiating insulator for a coil of an alternator or a magneto in automobile electric components. The evaluation was based on the results of experiments conducted by the present inventors; any sample which is designated "none" in the column "Problem" had a thermal conductivity of $9 \times 10^{-4}$ cal/cm.deg.sec or more, an impact resistance of 20 cm or more, a cut-through resistance of 260° to 450° C., a thermal deformation temperature of 100 to 260 kg/cm$^2$, an insulation resistance of $1 \times 10^9$ Ω.cm or more, and a withstand voltage of 9 kV/mm or more.

From the experiments conducted by the present inventors, it was confirmed that the requirement of "none" in the column "Problem" may be satisfied if the amount of the filler is suitably selected and if the filler is selected from the group consisting of aluminum, copper, boron carbide, beryllium oxide, magnesium oxide, and titanium oxide.

With the samples in which magnesium oxide was used as the filler, a satisfactory thermal conductivity could be obtained with a smaller amount than when alumina was used as the filler as in Examples 7 and 8. Thus, magnesium oxide is an excellent filler.

Figure 4:
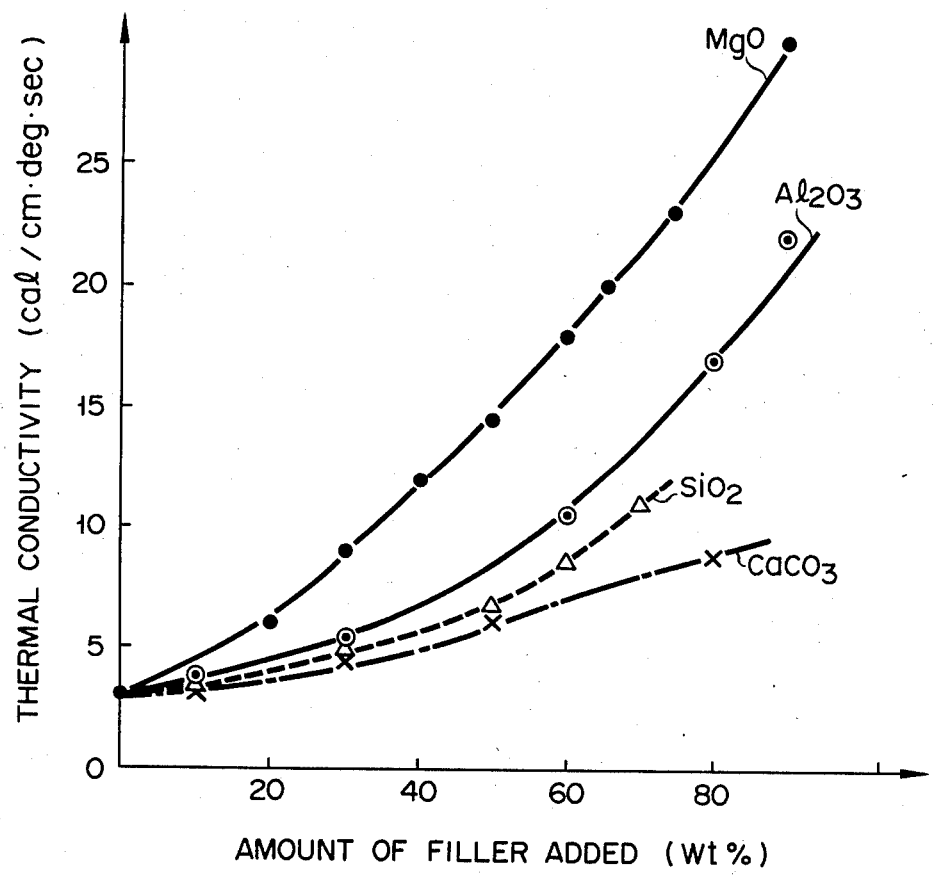
FIG. 4 is a graph showing the thermal conductivity as a function of the amount of the filler and illustrating the embodiment of the present invention.

FIG. 4 is a graph showing the thermal conductivity as a function of the amount of the filler when the filler is magnesium oxide (MgO), alumina (Al$_2$O$_3$), silicon oxide (SiO$_2$), or calcium carbonate (CaCO$_3$). It is seen from this graph that alumina provides the insulator layer with a higher thermal conductivity than silicon oxide and calcium carbonate but with a lower thermal conductivity than magnesium oxide.

In Examples 1 to 9, in order to lessen the interfacial thermal resistance between the thermosetting synthetic resin and the filler, the filler has a maximum particle size of 200μ and has a particle size distribution which provides a small total surface area. FIG. 5 is a graph showing the thermal conductivity as a function of the particle size distribution of the filler when magnesium oxide is the filler.

Referring to FIG. 5, characteristic curves A to D correspond to grades A to D below:

Grade A; 200μ maximum particle size, 3.5 g/cc bulk density

Grade B; 150μ maximum particle size, 2 g/cc bulk density

Grade C; 50μ maximum particle size, 1 g/cc bulk density

Grade D; 15μ maximum particle size, 0.45 g/cc bulk density

If the filler has a maximum particle size of 200μ or more, the coated insulator layer will have a rough surface, due to the presence of large particles, when the thickness of the layer is about 0.3 mm as in the conventional method.

The insulator layers in Examples 1 to 9 are formed by the known powder coating method. The powder coating must have the particle size, bulk density, and flow properties which fall within predetermined ranges. This will be described in more detail below.

(A) Particle size of powder coating

A powder coating of 60 mesh or less (JIS standard serves) was used. A powder coating which is coarser than 60 mesh has a poor free flow property during coating.

(B) Bulk density

A powder coating was used which had a bulk density of 0.3 to 0.9 g/cc as measured with JIS K 6911 (thermosetting plastic general test method). A powder coating which has a bulk density outside this range has a poor free flow property during coating.

(C) Flow properties (a) Horizontal flow properties (applies only to slot insulating powder coating, coated on the surfaces of metal members which house and hold coils)

The powder coating is pressed in the amount of 0.5 g at a pressure of 20 kg/cm² to prepare a pellet having a diameter of 13 mm and a thickness of about 2.5 mm. Such a pellet is placed on a flat polished steel plate preheated to 140° C. and is heated at this temperature for 20 to 30 minutes. After cooling, the average diameter is measured, and the flow properties are obtained according to the following equation:

$$\text{Flow property} = \frac{\text{Average pellet diameter after heating} - \text{Average pellet diameter before heating}}{\text{Pellet diameter before heating}} \times 100$$

Table 3 below shows the relationship between the flow properties (%) obtained in this manner and the outer appearance of the insulator layer.

TABLE 3

| Flow Properties (%) | 2 | 4 | 6 | 8 | 10 | 12 | 14 | 16 | 18 | 20 |
|---|---|---|---|---|---|---|---|---|---|---|
| Outer Appearance of Insulator Layer | Fair | Good | Good | Good | Good | Good | Good | Good | Fair | Poor |
| Remarks | Rough surface | — | — | — | — | — | — | — | Layer Droops | |

As can be seen from Table 3, a powder coating having a flow property of 4 to 16% is suitable as a slot insulator.

(b) 45° inclined flow properties (applies to coil fixing powder coating which is filled or molded between or over the wires of a coil)

A pellet prepared in the same manner as in item (a) above is placed on a polished steel plate preheated to 150° C. and inclined at 45°, and is heated at this temperature for 20 to 30 minutes. After cooling, the maximum length in the direction of flow is measured, and the 45° inclined flow property is obtained from the following equation:

45° inclined flow property =

$$\frac{\text{Maximum length in the direction of flow after heating} - \text{Pellet diameter before heating}}{\text{Pellet thickness before heating}}$$

If the 45° inclined flow property obtained in this manner is below 1.5, the filling property of the insulator into the gap between the wire turns is poor and provides only low fixing strength of the coil.

The insulator layer after hardening must have the impact resistance, cut-through resistance, thermal deformation temperature, adhesion strength under shear, insulation resistance, withstand voltage and thermal conductivity which fall within predetermined ranges. These predetermined ranges have been confirmed according to the experiments conducted by the present inventors and will be described below.

(D) Impact resistance

The powder coating is coated on a soft steel plate (S15C, 12×12×100) to a thickness of 0.3 to 0.5 mm and is cured. The impact resistance of the resultant insulator layer is measured with a Du Pont impact tester (½" head and 500 g load).

With an insulator layer which had a Du Pont impact test value of less than 20 cm, cracking or chipping occured in the insulator layer during winding due to wire tension. Since this causes defective grounding, the insulator for a coil is preferably a powder coating having an impact resistance of 20 cm or more.

(E) Cut-through resistance (heat-resistant softening temperature)

The powder coating is coated to a thickness of 0.3 to 0.5 mm on two thirds of the entire surface of a rectangular rod of a soft steel material (S15C, 12×12×100). After hardening the insulator layer, a bare copper wire of 0.4 mm diameter is wound on the cured insulator layer and a load of 250 g is exerted thereon. The temperature is raised at a rate of 3° C. per minute, and the critical temperature is that at which the insulator layer breaks. A powder coating having a cut-through resistance of 260° to 450° C. is preferable.

If the insulator layer has a cut-through resistance of below 260° C., it softens upon being heated to fix the coil. Then, the wire extends into the layer and defective grounding is caused. If an epoxy resin having a heat resistance of 450° C. or higher is used, the resultant insulator layer becomes brittle and the impact resistance requirement in item (D) above may not be satisfied.

(F) Thermal deformation temperature (HDT)

A powder coating having a thermal deformation temperature of 100° to 140° C. measured with JIS K 6911 is preferable. As in the case of the former item, a powder coating having an HDT outside this range fails to satisfy the required impact resistance.

(G) Adhesion strength under shear

Degreased test pieces (SPCC-SD, 100×15×1t) are adhered with a powder under a pressure of 1 kg/15×10 mm. The adhesion strength under shear is measured under a rate of pulling of 5 to 20 mm/min. A powder coating having an adhesion strength under shear of 100 to 260 kg/cm² is preferable. If the adhesion strength under shear is below 100 kg/cm², satisfactory adhesion strength under shear may not be obtained.

(H) Insulation resistance and withstand voltage

A sample is prepared by coating a powder coating on a soft steel plate (SPCC-RD, 60×60×1t) having a thickness of 0.3 to 0.5 cm. A powder coating having an insulating property which does not impair the quality of the electrical equipment (insulation resistance of $1 \times 10^9 \Omega$.cm or more) and a withstand voltage (JIS K 6911) of 9 kV/mm or more is preferable. If the insulating property and the withstand voltage are below these values, the rated leakage current requirement upon application of AC 1,200 V for automobiles cannot be satisfied.

(I) Thermal conductivity

A sample is prepared by molding a powder coating in a mold heated to 100° to 140° C., heating at 200° C. for about an hour, and completely curing to provide a disk of 35 mm diameter and 3 mm thickness. The thermal conductivity of the sample is measured with a thermal conductivity measuring device (Model SS-TC-33 available from Shibayama Kiki Seisakusho). A powder coating having a thermal conductivity of 9 to $30 \times 10^{-4}$ cal/cm.deg.sec is preferable.

If the thermal conductivity is below the lower limit, the heat radiating effect is poor. If the thermal conductivity is above the upper limit, the amount of the filler to be added becomes too large. As a result, the insulator layer becomes brittle, causing frequent cracking or chipping, and provides inferior insulating properties.

Figure 6:
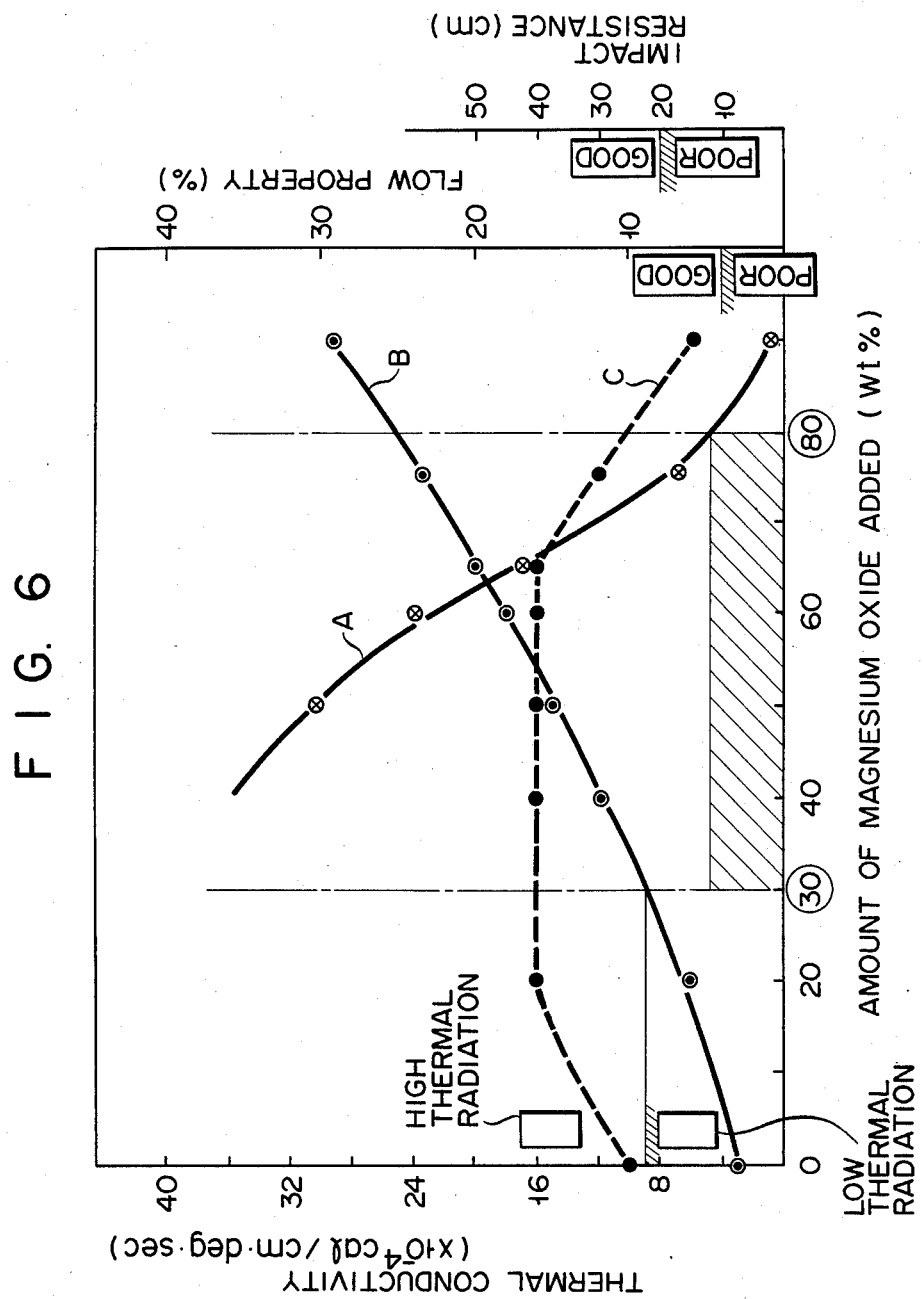
FIG. 6 is a graph showing the thermal conductivity, the flow properties, and the high-impact properties as a function of the amount of the filler.

Of the various properties described above, the relationships between the amount of the filler added and the thermal conductivity, impact resistance and flow property of the powder coating are shown in FIG. 6. The filler used is magnesium oxide, the particle size is 150μ or less, and the bulk density is 2 g/cc. When the filler is within the range indicated by the hatched lines in FIG. 6 corresponding to 30 to 80 wt %, practically acceptable characteristics of the insulator layer are obtained.

Referring to FIG. 6, curve A corresponds to the horizontal flow property, curve B corresponds to the thermal conductivity, and curve C corresponds to the impact resistance.

In Examples 1 to 9 above, powder coatings consisting mainly of an epoxy resin are used. However, other resins may be used and other coating methods may also be utilized. These will be described with reference to Examples 10 to 12.

EXAMPLE 10

The procedures of Example 1 were basically followed, except that a polyester powder coating was used instead of an epoxy resin powder coating. More specifically, 30 to 80 wt % of a thermally conductive filler (a powder of magnesium oxide, beryllium oxide, boron nitride, iron, aluminum, copper, boron carbide, titanium oxide or the like) having a thermal conductivity of $1.0 \times 10^{-2}$ cal/cm.deg.sec or more was added to a mixture of a polyester resin (Byron GV230 or GV100 available from Toyobo Co., Ltd., ER8200 or ER6610 from Nihon Gosei Kagaku K.K., or the like) with a curing agent for the polyester resin (Epicoat 1004 available from Shell Chemical Inc., an isocyanate resin or the like). A thixotropy agent and a leveling agent were added, and the resultant mixture was kneaded at a temperature between 70° and 130° C. The mixture was then rapidly cooled and was pulverized by the conventional method to provide a powder.

The thermally conductive polyester resin powder coating thus obtained had a particle size, bulk density, thermal conductivity, impact resistance, cut-through resistance, thermal deformation temperature, adhesion strength under shear, insulation resistance, withstand voltage, etc., which were within the ranges of the thermally conductive epoxy resin powder coating described above. However, the thermally conductive polyester resin powder coating generally has a longer curing time and an inferior adhesion strength under shear than the thermally conductive epoxy resin powder coating.

EXAMPLE 11

The procedures of Example 1 were basically followed, except that an acrylic resin powder coating was used in place of the epoxy resin powder coating. More specifically, 30 to 80 wt % of a thermally conductive filler having a thermal conductivity of 1.0 to $10^{-2}$ cal/cm.deg.sec (magnesium oxide, beryllium oxide, boron nitride, iron, aluminum, copper, boron carbide, titanium oxide or the like) was added to a mixture of an acrylic resin (for example, Almatix TD-6100 to 6400 available from Mitsui Toatsu Chemicals, Inc.) with a curing agent for the acrylic resin (dicarboxylic acid, a melamine resin or the like). A thixotropy agent, a leveling agent and an impact resistance improving agent (e.g., an epoxy resin) were added to the mixture. The resultant mixture was kneaded at a temperature between 70° and 130° C. and was then rapidly cooled and pulverized by the conventional method to provide a powder.

The thermally conductive acrylic resin powder coating thus obtained had the various properties within the ranges of those of the thermally conductive epoxy resin powder coating described above.

However, the acrylic resin powder coating generally has an adhesion strength under shear which is inferior to that of the thermally conductive epoxy resin powder coating.

Coating of the thermally conductive powder coatings in Examples 1 to 11 described above may be performed by the conventional coating method, examples of which include the fluidizing dip coating method, spraying method, electrostatic fluidizing dip coating method, and electrostatic spraying method.

EXAMPLE 12

A liquid resin was used in place of the powders in the former examples. A liquid resin (e.g., an epoxy resin or a polyester resin) was added to a thermally conductive filler to prepare an insulator as in the former examples.

More specifically, 30 to 80 wt % of a filler having a thermal conductivity of $1.0 \times 10^{-2}$ cal/cm.deg.sec or more (e.g., magnesium oxide available from Tomita Pharmaceutical Co. Inc.) was added to a mixture of 100 parts by weight of an epoxy resin (Epicoat 828 available from Shell Chemical Inc.) having an epoxy equivalent amount of 100 to 300 and a molecular weight of 250 to 470; 80 parts by weight of an acid anhydride (MHAC-L available from Hitachi Chemical Co., Ltd.) as a curing agent for the epoxy resin; 3 parts by weight of a curing accelerator for the epoxy resin (EMI available from Shikoku Chemicals Corporation); and 0 to 20 parts by weight of a gelling agent (aerozyl 200 available from Nihon Aerozyl K.K.). A pigment was added to the resultant mixture and was well mixed by a conventional mixing means.

The amount of the thixotropy agent varies depending upon the application (whether the insulator is for slot insulation or for coil fixing), the shape of the objective product (diameter and the manner of winding the wire), the amount of the filler added, etc. The amount of the thixotropy agent is preferably 3 to 20 parts by weight for slot insulation, and is preferably 0 to 6 parts by weight for coil fixing. The coating of the insulator may be performed by a conventional method such as the dipping method or dripping method.

Application examples will now be described wherein the insulators as prepared in the examples above are applied to automobile electric components.

APPLICATION EXAMPLE 1

An insulator was used for a motor cycle. After preheating a magneto stator core to 180° to 240° C., it was coated with a slot insulator powder coating to a thickness of 0.4 to 0.5 mm. After curing and cooling, the magnet wire or coil wire was wound. The core was preheated to 160° to 200° C. again and was coated by the fluidizing dip coating method with a coil fixing thermally conductive powder coating. The coating was cured to fix the coil and to form an insulator layer.

The magneto stator treated in this manner is as shown in FIGS. 7A, 7B and 7C wherein reference numeral 11 denotes a core; 13, an insulator layer; 14, a coil; and 15; an insulator. Table 4 below shows the cooling effect of the magneto stator in terms of the coil temperature.

grounding. Therefore, the powder of Test No. 9 was evaluated to be "poor".

As can be seen from Table 4, with the insulators prepared as in the examples of the present invention, the temperature of the coil of the magneto stator may be lowered by a maximum of 28° C. from that arising from using the conventional insulator. Better results are obtained if the insulator is used for fixing the coil.

When similar tests were run for the thermally conductive liquid resin in Example 12 above, similar results as shown in Table 4 were obtained. However, the powder coating was superior to the liquid coating in workability and the working environment.

APPLICATION EXAMPLE 2

An insulator was used for an alternator stator. After the alternator stators were preheated to 130° to 240° C., they were coated with a slot insulator powder coating by spraying to thicknesses of 0.1 to 0.15 mm and 0.3 to 0.5 mm. After curing and cooling, the winding was wound onto the stators. After preheating the stators to 140° to 220° C. again, they were coated by spraying with the coil fixing thermally conductive powder coating to fix the coils. The cooling effect of the coil of the alternator thus prepared is shown in Table 5 in terms of the output from the alternator. As shown in FIG. 8, since the output gap between the cool and hot times of the coil of the alternator stator is more distinct when the alternator rotates at a low speed than when it rotates at a high speed, the alternator is driven at a rate of 1,500 r.p.m. in this example.

TABLE 4

| Evaluation Good or poor | Test No. | Thermal Conductivity of Slot Insulator Powder (cal/cm · deg · sec) | Thermal Conductivity of Coil Fixing Powder (cal/cm · deg · sec) | Average Coil Temperature of ASSY Test (°C.) | Temperature Drop Effect with Reference to Test No. 1 (°C.) |
|---|---|---|---|---|---|
| Poor | 1 | $4 \times 10^{-4}$ | $3 \times 10^{-4}$ | 235 | 0 |
| Poor | 2 | $4 \times 10^{-4}$ | $7 \times 10^{-4}$ | 231 | 4 |
| Good | 3 | $4 \times 10^{-4}$ | $9 \times 10^{-4}$ | 229 | 6 |
| Good | 4 | $4 \times 10^{-4}$ | $12 \times 10^{-4}$ | 224 | 11 |
| Good | 5 | $12 \times 10^{-4}$ | $3 \times 10^{-4}$ | 228 | 7 |
| Good | 6 | $9 \times 10^{-4}$ | $9 \times 10^{-4}$ | 224 | 11 |
| Good | 7 | $12 \times 10^{-4}$ | $12 \times 10^{-4}$ | 220 | 15 |
| Good | 8 | $20 \times 10^{-4}$ | $20 \times 10^{-4}$ | 207 | 28 |
| Poor | 9 | $30 \times 10^{-4}$ | $30 \times 10^{-4}$ | 201 | 34 |

TABLE 5

Alternator: 1,500 r.p.m.

| Evaluation | Test No. | Slot Insulator Powder (cal/cm · deg · sec) | Film Thickness (mm) | Coil Fixing Powder (cal/cm · deg · sec) | Film Thickness (mm) | Output (A) | Temperature Drop Effect with Reference to Test No. 1 (A) |
|---|---|---|---|---|---|---|---|
| Poor | 1 | $4 \times 10^{-4}$ | 0.3–0.5 | $3 \times 10^{-4}$ | 0.2–0.3 | 25.9 | 0 |
| Good | 2 | $4 \times 10^{-4}$ | 0.3–0.5 | $12 \times 10^{-4}$ | 0.2–0.3 | 26.8 | 0.9 |
| Good | 3 | $12 \times 10^{-4}$ | 0.3–0.5 | $3 \times 10^{-4}$ | 0.2–0.3 | 26.7 | 0.8 |
| Good | 4 | $12 \times 10^{-4}$ | 0.3–0.5 | $12 \times 10^{-4}$ | 0.2–0.3 | 27.4 | 1.5 |
| Good | 5 | $12 \times 10^{-4}$ | 0.1–0.15 | $12 \times 10^{-4}$ | 0.2–0.3 | 27.9 | 2.0 |
| Good | 6 | $12 \times 10^{-4}$ | 0.1–0.15 | $12 \times 10^{-4}$ | 0.1–0.15 | 28.4 | 2.5 |
| Good | 7 | $20 \times 10^{-4}$ | 0.3–0.5 | $20 \times 10^{-4}$ | 0.2–0.3 | 28.3 | 2.4 |
| Poor | 8 | $30 \times 10^{-4}$ | 0.3–0.5 | $30 \times 10^{-4}$ | 0.2–0.3 | 28.8 | 2.9 |

Slot insulator powders in Test Nos. 1 to 4 are conventional powders, and coil fixing powders in Test Nos. 1 and 2 are also conventional powders. Although the test piece used in Test No. 9 presents no problem from the measurement data, the insulator layer exhibited moderate chipping and one out of six coils caused defective Referring to Table 5, the slot insulator powders of Test Nos. 1 and 2 are conventional powders, and the coil fixing powder of Test No. 1 is also a conventional powder. Since the test piece used in Test No. 8 exhibited slight chipping, it was evaluated to be "poor".

As can be seen from Table 5, the output from the alternator with the hot coil is improved when the heat radiating effect is improved.

Referring to FIG. 8, curve A represents the output r.p.m. characteristic when the coil is cool, curve B represents the same when the coil is hot, and curve C represents the same when the rotor coil alone is cool.

APPLICATION EXAMPLE 3

An insulator was applied to an alternator bobbin. The alternator has a configuration as shown in FIG. 9. A pair of pole cores 17a and 17b is coupled to a rotating shaft 16. Each of the pole cores 17a and 17b has a plurality of magnetic pawls 18a and 18b, respectively. These magnetic pawls 18a and 18b interleave each other. Inside the magnetic pawls 18a and 18b, a bobbin 19 is fixed and a coil 20 is wound therearound.

The bobbin 19 comprises a molded body of a resin such as nylon or polybutylene terephthalate. Therefore, although an additional insulation treatment is unnecessary, the bobbin 19 has a thermal conductivity which is as low as 3 to $5 \times 10^{-4}$ cal/cm.deg.sec and impairs the heat radiation from the coil 20.

For this reason, it is preferable to change the material of the bobbin 19 from nylon or the like which is a thermally non-conductive material to a metal (e.g., iron, copper, aluminum or the like) which is a thermally conductive material, having a thermal conductivity of 0.15 to 1.0 cal/cm.deg.sec.

Although the thermal conductivity is improved with a metal bobbin of iron or steel, insulation performance is impaired. Therefore, the thermally conductive resin must be coated over the metal bobbin for insulation.

A case in which an iron bobbin is used for the bobbin 19 and a thermally conductive epoxy powder coating is used for the insulator will now be described.

An iron bobbin is coated with a slot insulator powder coating by the electrostatic fluidizing dip coating method. The coating is performed under the conditions of a 50 to 90 kV application voltage, the rotation of the alternator being at 5 to 25 r.p.m. a 4 to 30 second coating time, and the distance between the bobbin and the powder fluidized surface being at 2 to 8 cm. The coated powder is melted and cured at 150° to 240° C. for 1 to 30 minutes. The coil 20 is wound on the bobbin 19 thus prepared to provide a rotor as shown in FIG. 9. The cooling effect of the coil of the rotor is shown in Table 6 in terms of the output from the alternator as in the case of the alternator stator in Application Example 2 described above. However, unlike the case of the stator, the cooling effect of the coil of the rotor is greater when the rotational speed is higher. Therefore, the output from the alternator shown is of the value obtained when the speed is 5,000 r.p.m.

The stator used is a conventional stator, and the slot powder coating of Test No. 2 is a conventional coating.

As is apparent from Table 6, the output from the alternator is improved when the rotational frequency is higher. The insulator layer presented no chipping and its other properties were satisfactory.

An insulator layer of good adhesion strength under shear is obtained if an epoxy resin is used for the thermosetting synthetic resin composition. An insulator layer of better mechanical strength, heat radiating effect and electric characteristics is obtained if magnesium oxide is used as the filler.

If the insulator is used for molding between the magnet wires or thereover, molding is facilitated and the coil fixing strength is good when the 45° inclined flow property is 1.5 or more.

On the other hand, if the insulator is used for housing and fixing the coil, the rough surface of the layer and drooping thereof may be prevented if the horizontal flow property is 4 to 16%.

An insulator for a coil of an automobile electric component with excellent heat radiating effect and electric and mechanical performances may be obtained using a powder for forming an insulator layer, the powder having a mesh of 60 or less, a bulk density of 0.3 to 0.91 g/cc, a thermal conductivity of $9 \times 10^{-4}$ cal/cm.deg.sec or more after curing, an impact resistance of 20 cm or more, a cut-through resistance of 260° to 450° C., a thermal deformation temperature of 100° to 140° C., an adhesion strength under shear of 100 to 200 kg/cm$^2$, and an insulation resistance of $1 \times 10^9 \Omega$.cm or more.

In summary, an insulator of the present invention has an excellent heat radiating effect and good electrical and mechanical performances. The insulator of the present invention is prepared by adding a filler such as a metal oxide, a nitride, or a carbide having a thermal conductivity of $1.0 \times 10^{-2}$ cal/cm.deg.sec or more, a particle size of 200μ or less, and a bulk density of 1.0 to 3.5 g/cc to a thermosetting synthetic resin composition. After curing, the insulator has a withstand voltage of 9 kV/mm or more. Therefore, the insulator of the present invention can be conveniently used for slot insulation or coil fixing for the coil of an automobile electric component, and is capable of reducing copper loss which might otherwise be caused upon temperature rise. Therefore, the insulator of the present invention allows a greater output from electric components of the same size and specifications as conventional components.

If an insulator of the present invention is used for automobile electric components such as a magneto, a blower motor, a starter, a wiper motor, a relay coil or the like, the coil may be made compact in size and light in weight, and may be able to provide a thermally stable coil with an excellent heat radiating effect.

TABLE 6

| | | | Slot Insulator Powder | | Alternator: 5,000 r.p.m. | |
|---|---|---|---|---|---|---|
| Evaluation | Test No. | Material of Bobbin | (cal/cm · deg · sec) | Film Thickness (mm) | Output (A) | Temperature Drop Effect with Reference to Test No. 1 (A) |
| Poor | 1 | Nylon Resin | — | — | 48.8 | 0 |
| Poor | 2 | Iron | $4 \times 10^{-4}$ | 0.06–0.12 | 50.1 | 1.3 |
| Good | 3 | Iron | $12 \times 10^{-4}$ | 0.06–0.12 | 51.3 | 2.5 |
| Good | 4 | Iron | $12 \times 10^{-4}$ | 0.2–0.3 | 50.7 | 0.9 |
| Good | 5 | Iron | $20 \times 10^{-4}$ | 0.2–0.3 | 51.8 | 3.0 |
| Good | 6 | Iron | $30 \times 10^{-4}$ | 0.2–0.3 | 52.6 | 3.8 |

What we claim is:

1. A heat radiating insulator which is in the form of powder and used in a coil by impregnation or by coating, comprising
    a thermosetting synthetic resin compound; and
    a filler added to the thermosetting synthetic compound, consisting mainly of magnesium oxide, and a thermal conductivity of $1.0 \times 10^{-2}$ cal/cm.deg.-sec and a bulk density of 1.0 to 3.5 g/cc,
    said filler being mixed with said thermosetting synthetic resin compound when said thermosetting synthetic resin compound has been melted at a temperature of 70° to 130° C.

2. An insulator according to claim 1, wherein magnesium oxide as the filler has a particle size of not more than 200μ.

3. An insulator according to claim 1, wherein magnesium oxide as the filler has a particle size of not more than 200μ, and magnesium oxide is added in an amount of 30 to 80% by weight with respect to 100% by weight of the thermosetting synthetic resin composition.

4. An insulator according to claim 1, wherein the thermosetting synthetic resin composition mixed with said filler comprises particles having a particle size of not more than 60 mesh and a bulk density of 0.3 to 0.91 g/cc.

5. An insulator according to claim 1, wherein the thermosetting synthetic resin composition mixed with said filler comprises particles having a particle size of not more than 60 mesh and a bulk density of 0.3 to 0.91 g/cc, and the particles have, after curing, a thermal conductivity of not less than $9 \times 10^{-4}$ cal/cm.deg.sec, an impact resistance of not less than 20 cm, a cut-through resistance of 260° to 450° C., a thermal deformation temperature of 100° to 140° C., an adhesion strength under shear of 100 to 260 kg/cm², and an insulation resistance of $1 \times 10^9 \Omega$.cm.

6. An insulator according to claim 1, wherein said magnesium oxide of the filler has a particle size of not more than 200μ and a bulk density of 1.0 g/cc to 3.5 g/cc, said thermosetting synthetic resin is an epoxy resin, and the weight of said filler accounts for 30% to 80% of the weight of the epoxy resin.

* * * * *